(12) United States Patent
Beecroft et al.

(10) Patent No.: US 11,988,143 B2
(45) Date of Patent: May 21, 2024

(54) SYSTEM AND METHOD FOR DETERMINING HIGH OIL CONSUMPTION IN GAS TURBINE ENGINE

(71) Applicant: ROLLS-ROYCE PLC, London (GB)

(72) Inventors: Peter A Beecroft, Derby (GB); Dongfeng Shi, Nottingham (GB); Daniel Cutting, Nottingham (GB); James A Cooke, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/473,072

(22) Filed: Sep. 13, 2021

(65) Prior Publication Data
US 2022/0090515 A1 Mar. 24, 2022

(30) Foreign Application Priority Data

Sep. 23, 2020 (GB) ...................................... 2015023

(51) Int. Cl.
*F02C 7/06* (2006.01)
*F02C 9/00* (2006.01)

(52) U.S. Cl.
CPC .................. *F02C 7/06* (2013.01); *F02C 9/00* (2013.01); *F05D 2260/80* (2013.01); *F05D 2260/821* (2013.01)

(58) Field of Classification Search
CPC ...... F02C 7/06; F02C 9/32; F02C 9/28; F02C 9/285; F01D 25/18; F01D 25/20;
(Continued)

(56) References Cited

U.S. PATENT DOCUMENTS

| | | | | |
|---|---|---|---|---|
| 4,794,897 A | * | 1/1989 | Kinouchi | ............... F02P 15/008 |
| | | | | 123/41.15 |
| 5,070,832 A | * | 12/1991 | Hapka | ..................... F02D 17/04 |
| | | | | 123/333 |

(Continued)

FOREIGN PATENT DOCUMENTS

| | | |
|---|---|---|
| CN | 104343492 A | 2/2015 |
| DE | 4118896 A1 | 12/1992 |

(Continued)

OTHER PUBLICATIONS

George J. Noel, Thrust Reverser Analysis for Implementation in the Aviation Environmental Design Tool (Year: 2007).*

(Continued)

*Primary Examiner* — Katheryn A Malatek
*Assistant Examiner* — Jingchen Liu
(74) *Attorney, Agent, or Firm* — Oliff PLC

(57) ABSTRACT

A system and a method for determining a high oil consumption in a gas turbine engine of an aircraft are provided. The method includes determining one or more engine and aircraft conditions. The one or more engine and aircraft conditions includes at least one of an oil quantity, an oil temperature, an oil pressure, an engine speed, an aircraft altitude, and an aircraft attitude. The method further includes determining a trend in oil conditions based on at least the one or more engine and aircraft conditions. The trend in oil conditions provides at least one of a rate of consumption of oil or a time duration of remaining oil. The method further includes determining the high oil consumption based on a comparison of the trend in oil conditions with a threshold or a comparison model.

17 Claims, 10 Drawing Sheets

(58) Field of Classification Search
CPC .... F01D 21/003; F01D 21/14; F05D 2260/80;
F05D 2260/81; F05D 2260/821; F05D
2260/98; F01M 1/06; F01M 1/10–12;
F01M 1/16; F01M 1/18; F16N 2260/02;
F16N 2260/04; F16N 2260/05; F16N
2260/20; F16N 2260/60; F16N 2270/20;
F16N 17/02; F16N 19/003; F16N 19/006;
F16N 29/04; F16N 2210/08; F16N
2230/00; F16N 2230/06; F16N 2250/04;
F16N 2250/06; F16N 2250/40; F16H
57/0405; G07C 5/08; G08G 5/0039
USPC ............................................ 701/100, 3, 29.5
See application file for complete search history.

(56) References Cited

U.S. PATENT DOCUMENTS

| | | | |
|---|---|---|---|
| 5,110,257 A | | 5/1992 | Hibner et al. |
| 6,138,081 A | * | 10/2000 | Olejack ................ G01M 15/00 |
| | | | 702/182 |
| 8,483,902 B2 | | 7/2013 | Cornet et al. |
| 2004/0093150 A1 | | 5/2004 | Arai et al. |
| 2006/0054406 A1 | | 3/2006 | Delaloye |
| 2009/0076677 A1 | | 3/2009 | Walthall et al. |
| 2009/0103843 A1 | * | 4/2009 | Maguire ................. F16C 41/02 |
| | | | 384/420 |
| 2009/0107771 A1 | | 4/2009 | Liu et al. |
| 2009/0164056 A1 | * | 6/2009 | Cornet .................... F01M 1/18 |
| | | | 701/100 |
| 2009/0299535 A1 | | 12/2009 | Delaloye |
| 2010/0025158 A1 | | 2/2010 | Allam |
| 2013/0080022 A1 | * | 3/2013 | Mc Donald ............ F01M 11/12 |
| | | | 701/102 |
| 2013/0227960 A1 | | 9/2013 | Bonner |
| 2013/0325212 A1 | * | 12/2013 | Wickman ................ F01D 25/18 |
| | | | 701/3 |
| 2015/0308878 A1 | | 10/2015 | Pech et al. |
| 2016/0311527 A1 | * | 10/2016 | Poster ................ F16H 57/0434 |
| 2017/0152776 A1 | * | 6/2017 | Butler .................... G01M 15/09 |
| 2018/0252116 A1 | * | 9/2018 | Ahumada Parás ..... F01D 25/20 |
| 2021/0381429 A1 | * | 12/2021 | Taylor .................... B60L 50/60 |

FOREIGN PATENT DOCUMENTS

| | | |
|---|---|---|
| DE | 4429234 A1 | 8/1995 |
| EP | 2072762 A1 | 6/2009 |
| EP | 2458161 A1 | 5/2012 |
| EP | 2829697 A1 | 1/2015 |
| EP | 2829698 A1 | 1/2015 |
| EP | 3369895 A2 | 9/2018 |
| FR | 2958911 A1 | 10/2011 |
| FR | 3093806 A1 | 9/2020 |
| KR | 20060006232 A | 1/2006 |
| WO | 94/20739 A2 | 9/1994 |
| WO | 2013/037865 A1 | 3/2013 |

OTHER PUBLICATIONS

Feb. 16, 2022 Extended European Search Report issued in Patent Application No. 21195169.4.

Feb. 16, 2021 Search Report issued in British Patent Application No. 2015023.1.

\* cited by examiner

SYSTEM AND METHOD FOR DETERMINING HIGH OIL CONSUMPTION IN GAS TURBINE ENGINE

CROSS-REFERENCE TO RELATED APPLICATIONS

This specification is based upon and claims the benefit of priority from UK Patent Application Number 2015023.1 filed on Sep. 23, 2020, the entire contents of which are incorporated herein by reference.

FIELD OF THE DISCLOSURE

The present disclosure generally relates to a system and a method for determining high oil consumption in a gas turbine engine of an aircraft.

BACKGROUND

Gas turbine engines generally require a continuous flow of lubricant, such as oil to ensure proper functioning of the rotating components of the gas turbine engine. Oil leaks may occur within the engine due to engine component failure or maintenance errors. Such changes may be very subtle and may not catch the attention of the flight crew through the exiting flight deck instruments. Also, long term change in oil levels may not be discovered due to transient changes, such as oil gulp, where oil level may change rapidly with change in engine power levels. Further, routine checking of oil quantity may not be a standard practice for the flight crew.

Generally, flight crew is not notified about the loss of oil until the oil level breaches a predetermined threshold valve. Such notifications may not enable the flight crew to respond in a timely manner. Also, such notifications generally do not provide any further guidance to address high oil consumption.

SUMMARY OF THE DISCLOSURE

According to a first aspect there is provided a method for determining a high oil consumption in a gas turbine engine of an aircraft. The method includes determining one or more engine and aircraft conditions. The one or more engine and aircraft conditions includes at least one of an oil quantity, an oil temperature, an oil pressure, an engine speed, an aircraft altitude, and an aircraft attitude. The method further includes determining a trend in oil conditions based on at least the one or more engine and aircraft conditions. The trend in oil conditions provides at least one of a rate of consumption of oil or a time duration of remaining oil. The method further includes determining the high oil consumption based on a comparison of the trend in oil conditions with a threshold or a comparison model.

In some embodiments, determining the trend in oil conditions further includes determining a time differential of an instantaneous oil level or an average oil level.

In some embodiments, determining the trend in oil conditions further includes using the one or more engine and aircraft conditions in a trend model. In some embodiments, the trend model includes at least one of a linear regression, a non-linear regression model, a support vector machine-learning based model, a first principle model, a Hidden Markov model, and a Bayesian networks-based model.

In some embodiments, the method further includes determining a variation in the oil level based on one or more dynamic parameters. In some embodiments, the one or more dynamic parameters includes at least one of an oil gulp, an oil temperature variation, an aircraft attitude, a change in oil level inside an oil tank, engine deterioration, and an engine-to-engine variation.

In some embodiments, the threshold includes at least one of an oil consumption limit and a remaining time to a predetermined level of oil.

In some embodiments, the comparison model includes at least one of a real-time model of oil level, an oil consumption behaviour model, an adaptive model based on Kalman filter, and a neural network.

In some embodiments, the method further includes retrieving a flight information of the aircraft. The flight information includes at least one of a flight plan, ambient conditions, a location of the aircraft, and airport information. In some embodiments, the high oil consumption is determined further based on the flight information of the aircraft.

In some embodiments, the method further includes retrieving an engine historic information. The high oil consumption may be determined further based on the engine historic information.

In some embodiments, the method further includes providing an alert to a flight crew and/or a ground crew based on the high oil consumption.

In some embodiments, the method further includes determining an oil starvation condition of the gas turbine engine based on the high oil consumption. In some embodiments, the method further includes providing an oil starvation warning to the flight crew and/or the ground crew based on the oil starvation condition.

In some embodiments, the method further includes determining an engine setting of the gas turbine engine to mitigate the oil starvation condition. In some embodiments, the engine setting includes a power setting of the gas turbine engine.

Some embodiments of the present disclosure relate to a system for determining a high oil consumption in a gas turbine engine of an aircraft. The system includes one or more sensors configured to detect one or more engine and aircraft conditions and generate signals indicative of the one or more engine and aircraft conditions. The system further includes a processor configured to receive the signals from the one or more sensors. The processor is configured to determine the one or more engine and aircraft conditions. The one or more engine and aircraft conditions includes at least one of an oil quantity, an oil temperature, an oil pressure, an engine speed, an aircraft altitude, and an aircraft attitude. The processor is further configured to determine a trend in oil conditions based on at least the one or more engine and aircraft conditions. The trend in oil conditions provides at least one of a rate of consumption of oil or a time duration of remaining oil. The processor is further configured to determine the high oil consumption based on a comparison of the trend in oil conditions with a threshold or a comparison model.

In some embodiments, the processor is further configured to determine a time differential of an instantaneous oil level or an average oil level.

In some embodiments, the processor is further configured to use the one or more engine and aircraft conditions in a trend model.

In some embodiments, the processor is further configured to determine a variation in the oil level based on one or more dynamic parameters.

In some embodiments, the processor is further configured to determine the high oil consumption further based on a flight information of the aircraft and an engine historic information.

In some embodiments, the processor is further configured to provide an alert to a flight crew and/or a ground crew based on the high oil consumption.

In some embodiments, the processor is further configured to determine an oil starvation condition of the gas turbine engine based on the high oil consumption.

In some embodiments, the processor is further configured to determine an engine setting of the gas turbine engine to mitigate the oil starvation condition.

In some embodiments, the engine setting includes a power setting of the gas turbine engine.

The method and system of the present disclosure may allow the flight crew and/or the ground crew to be alerted if a high oil consumption of the engine is detected. Various transient or dynamic conditions, such as oil gulp, may be taken into account for determining the high oil consumption, thereby preventing false alarms. The flight crew and/or the ground crew may further be alerted if the high oil consumption may lead to an oil starvation condition. The trend in oil conditions may advantageously allow the flight crew to determine the oil starvation condition in a timely manner. This may enable the flight crew and/or the ground crew to take an informed decision to reduce disruption in operations, and hence the operational costs of airlines.

The method and system may enable the high oil consumption information to be presented in an informative manner so as to improve situational awareness of the flight crew regarding aircraft engines, and to guide the flight crew through a decision making process. Human factors may also be considered regarding the manner in which the information is presented to ensure appropriate flight crew response. This may allow improved and more consistent outcomes in various engine conditions. The flight crew may choose to divert the flight to a maintenance base as opposed to landing at a remote location away from any maintenance support.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being) $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20.

The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
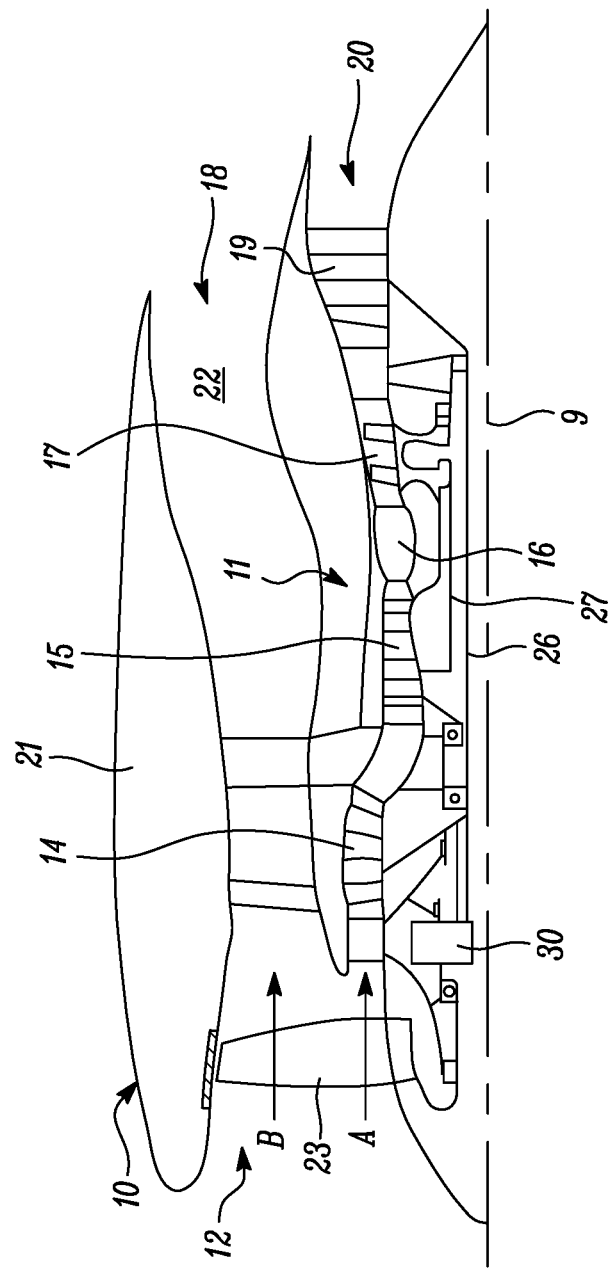
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
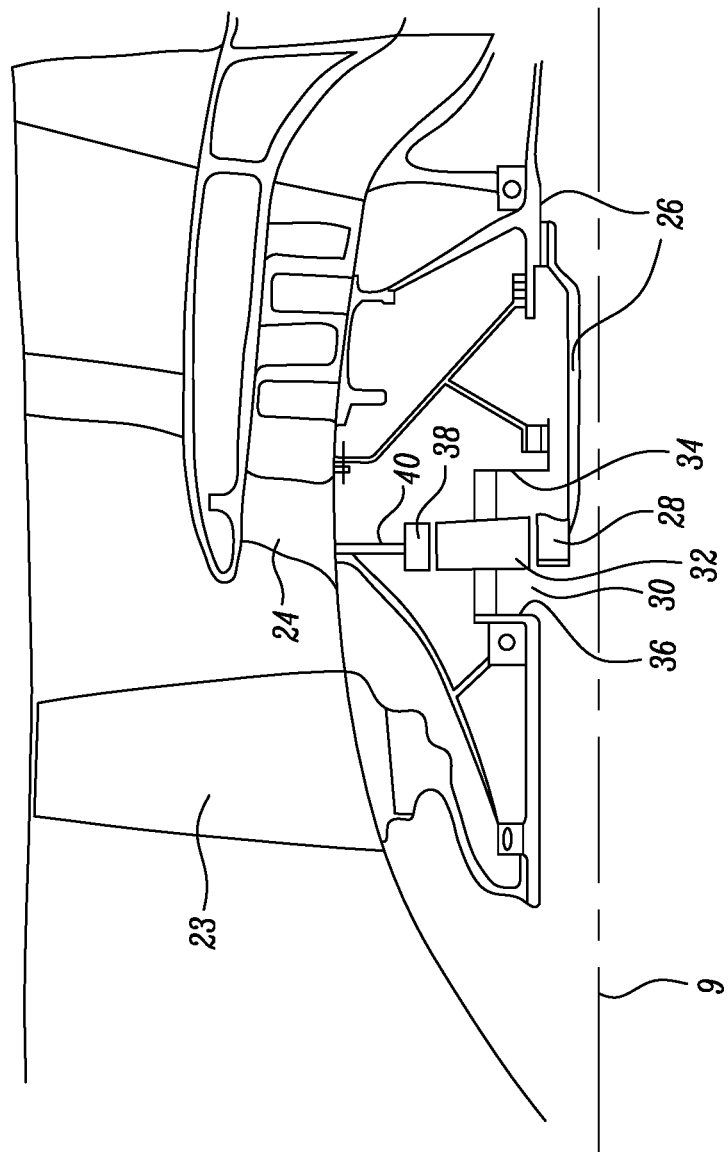
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the rotational axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
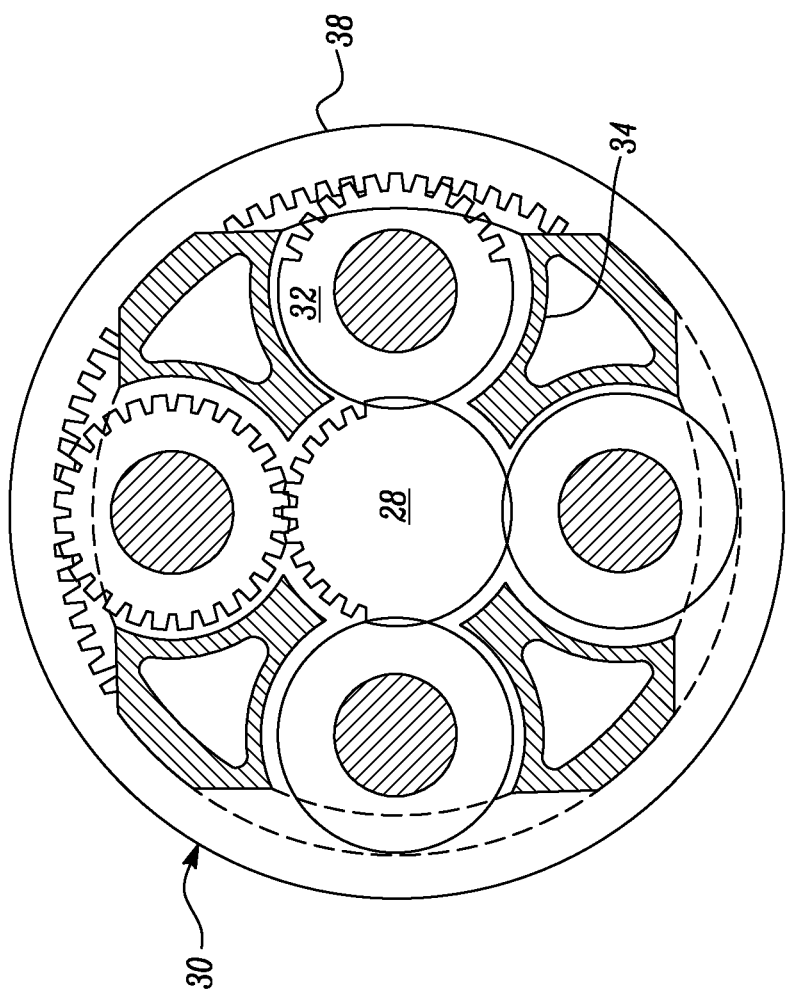
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the Figure view). The axial, radial and circumferential directions are mutually perpendicular.

In addition, the present invention is equally applicable to aero gas turbine engines, marine gas turbine engines and land-based gas turbine engines.

Figure 4:
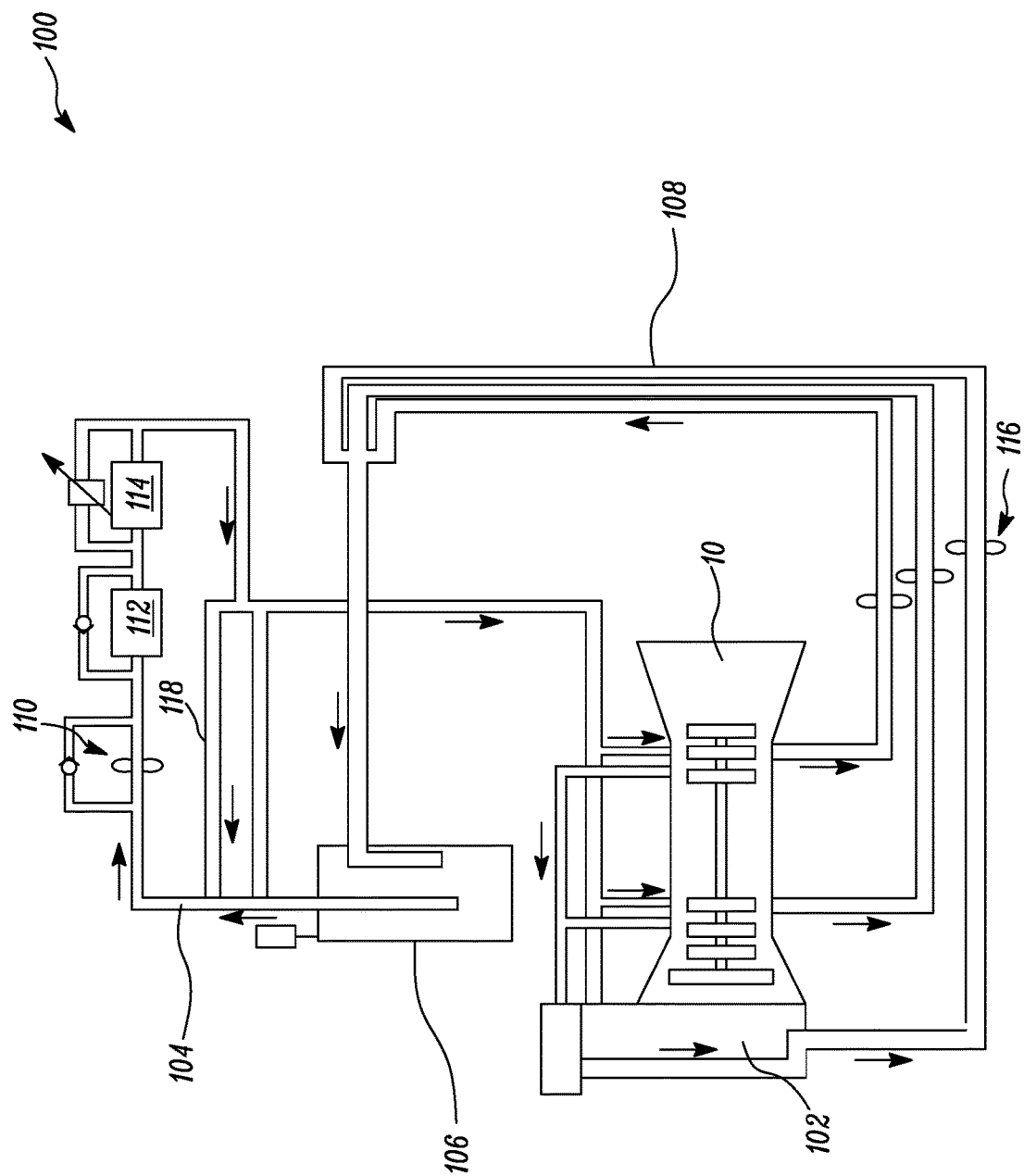
FIG. 4 is a schematic block diagram of an oil system of the gas turbine engine of an aircraft.

FIG. 4 illustrates an exemplary arrangement of an oil system 100 of a gas turbine engine of an aircraft. For example, the oil system 100 may be a part of the gas turbine engine 10 of FIG. 1. The gas turbine engine 10 is interchangeably referred to as the engine 10. The oil system 100 may provide lubrication, cooling and corrosion protection to the engine 10 and its components. In the exemplary arrangement shown in FIG. 4, the engine 10 is coupled to a gearbox 102.

A first oil circuit 104 of the oil system 100 may circulate oil or any other lubricant from an oil tank 106 to the engine 10 and the gearbox 102. The oil tank 106 provides a reservoir of oil to supply to the oil system 100. A second oil circuit 108 may allow oil from the engine 10 and the gearbox 102 to flow back to the oil tank 106. Optionally, the first oil circuit 104 may include a bypass circuit 118 for directing oil back to the oil tank 106. The first oil circuit 104 may include a pressure pump 110, a filter 112, and a heat exchanger 114. The pressure pump 110 may pressurize oil in the first oil circuit 104. The pressure pump 110 may be any kind of pump including, but not limited to, a vane pump, a gear pump, a gerotor pump, and the like. The oil may then pass through the filter 112 and the heat exchanger 114. The filter 112 may remove any unwanted elements from the first oil circuit 104. The heat exchanger 114 may remove heat from the oil. The first oil circuit 104 may further include multiple sensors, such as pressure and temperature sensors, for monitoring purposes. The first oil circuit 104 may include single or multiple oil lines for supplying oil to the engine 10 or the gearbox 102. Pressure relief valves may be provided with the pressure pump 110 and/or the filter 112.

The second oil circuit 108 may include scavenge pumps 116 that pressurize oil for flow back to the oil tank 106. The second oil circuit 108 may also include temperature and pressure sensors for monitoring purposes. The oil may pass through a filter before entering the oil tank 106. It should be understood that the oil system 100 of FIG. 4 is exemplary in nature and may vary from engine to engine and aircrafts.

The oil may be any suitable lubricant that can perform lubrication for one or more components of the engine 10. The components may include bearings, gears, shafts, and so forth.

Figure 5:
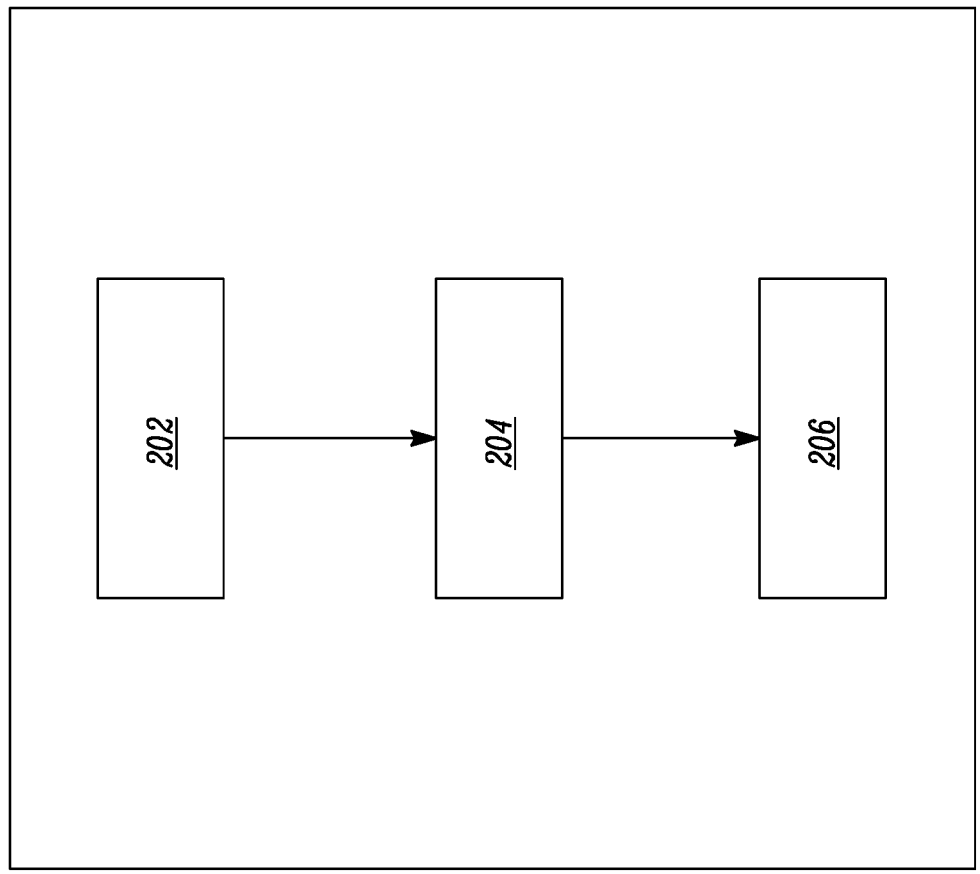
FIG. 5 is a schematic block diagram of a system of the gas turbine engine according to an embodiment of the present disclosure.

FIG. 5 illustrates a block diagram of a system 200. The system 200 determines a high oil consumption in the gas turbine engine 10 of the aircraft. For example, the system 200 determines the high oil consumption in the gas turbine engine 10 of FIG. 1. In some embodiments, the system 200 may detect a high oil consumption of the oil system 100 of FIG. 4. The system 200 includes one or more sensors 202 configured to detect one or more engine and aircraft conditions and generate signals indicative of the one or more engine and aircraft conditions. In some embodiments, the one or more sensors 202 may include at least one of an oil quantity sensor, oil temperature sensor, oil pressure sensor, engine speed sensor, aircraft altitude sensor, aircraft attitude sensor, and the like. In some embodiments, the one or more sensors 202 may include sensors that determine engine power settings, oil viscosity, oil density, and ambient conditions, such as temperature, pressure, altitude, etc. The one or more sensors 202 may include any type of sensors, such as, but not limited to, temperature sensors, pressure sensors, flow rate sensors, optical sensors, infrared sensors, laser sensors, composition sensors, and so forth. In some embodiments, the one or more sensors 202 may be provided with the oil tank 106 of the oil system 100.

The system 200 further includes a processor 204 configured to receive the signals from the one or more sensors 202. The processor 204 is configured to determine the one or more engine and aircraft conditions based at least on the signals from the one or more sensors 202. The one or more engine conditions include at least one of an oil quantity, an oil temperature, an oil pressure, an engine speed, an aircraft altitude, and an aircraft attitude. Further, the processor 204 is configured to determine a trend in oil conditions based on at least the one or more engine and aircraft conditions. The trend in oil conditions provides at least one of a rate of consumption of oil or a time duration of remaining oil. The processor 204 is further configured to determine the high oil consumption based on a comparison of the trend in oil conditions with a threshold or a comparison model. As used herein, the high oil consumption of the engine 10 means that the oil consumption of the engine 10 is determined to be more than the oil consumption of the engine 10 under normal operating conditions.

In some embodiments, the processor 204 may be embodied in a number of different ways. For example, the processor 204 may be embodied as various processing means, such as one or more of a microprocessor or other processing elements, a coprocessor, or various other computing or processing devices including integrated circuits such as, for example, an ASIC (application specific integrated circuit), an FPGA (field programmable gate array), or the like. In some embodiments, the processor 204 may be configured to execute instructions stored in a memory or otherwise accessible to the processor 204.

As such, whether configured by hardware or by a combination of hardware and software, the processor 204 may represent an entity (e.g., physically embodied in circuitry—in the form of processing circuitry) capable of performing operations according to some embodiments while configured accordingly. Thus, for example, when the processor 204 is embodied as an ASIC, FPGA or the like, the processor 204 may have specifically configured hardware for conducting the operations described herein. Alternatively, as another example, when the processor 204 is embodied as an executor of software instructions, the instructions may specifically configure the processor 204 to perform the operations described herein.

In some embodiments, the signals from the one or more sensors 202 may be checked to determine if the data obtained from the signals is reliable enough to be used for further analysis. In some embodiments, the signals from the one or more sensors 202 may be conditioned to obtain data that is reliable. For example, the signals may be checked for errors before further use of the data obtained from the signals. In some examples, range checks may be applied to determine if the data is within a range of acceptable values. In some examples, the data may be cross-checked for any random errors. In some examples, the signals from the one or more sensors 202 may be filtered to remove any noise in the signals.

In some embodiments, the processor 204 is further configured to determine a variation in the oil level based on one or more dynamic parameters. For example, the processor 204 may determine an oil level inside the oil tank 106 after considering one or more dynamic parameters. The one or more dynamic parameters may cause variation in the oil level inside the oil tank 106 due to operation of the engine 10 and/or the aircraft. In some embodiments, the one or more dynamic parameters include at least one of an oil gulp, an oil temperature variation, an aircraft attitude, a change in oil level inside an oil tank (for example, the oil tank 106), engine deterioration, and an engine-to-engine variation.

In some embodiments, the processor 204 may consider variation in the oil level inside the oil tank 106 due to oil gulp. Oil gulp may be caused due to change in speed, such as acceleration of the engine 10 during operation. Oil gulp may lead to transient behaviour in which the oil level inside the oil tank 106 may drop sharply followed by gradual transients as the oil returns from the engine 10. In some embodiments, the processor 204 may consider a steady state offset for the oil level. Steady state offset may account for retention of a quantity of oil within the engine 10. In another embodiment, a relationship may be established between engine power or engine speed and the oil level inside the oil tank 106. Such a relationship may be utilized to identify the steady state offset as described above. In other embodiments, a learning platform may be utilized that can be trained over a training period. The learning platform may be based on machine learning. For example, the learning platform may be trained with data from a fleet of engines.

In some examples, the variation due to oil gulp may be rejected by sampling the signals from the one or more sensors 202 at sufficiently low frequencies. In some examples, the signals from the one or more sensors 202 may be averaged over a long duration of time such that variation due to engine operation may not impact the signals. In some examples, the oil level data signals from the one or more sensors 202 may be ignored during transient operation of the engine 10 or dynamic phases of the flight. In some examples, the oil level data signals may be ignored during such transient operation and/or for a period of time thereafter.

Oil gulp may vary between engines and with deterioration of the engines. To account for such variations, a correlation between engine speed and oil gulp may be learnt by the system 200 over a training period. In some examples, the training period may include a sufficient number of flights that is determined either through flight cycle counting or until the observed correlation becomes stable. In some examples, the correlation may then be continuously monitored. In some examples, if the current engine correlation moves outside certain limits, the learning process may be run again. Further, oil gulp may also be affected due to change in oil conditions, such as oil temperature, oil density, etc. In such conditions, a relationship between one or more oil conditions and the oil gulp can be established. In some examples, a learning-based approach may also be utilized to characterise oil conditions with oil gulp.

Change is oil conditions, such as oil temperature, may also affect volume of oil. For example, the oil level inside the oil tank 106 may change due to change in temperature of oil. In some example, the change is volume of oil due to oil temperature variation may be considered by the processor 204 for determining correct engine conditions. For example, the processor 204 may determine a static characteristic between oil temperature and oil volume. In some examples, such a characteristic may be learned over a training period. The characteristic may vary from one engine to another engine.

In some embodiments, the processor 204 may determine a change in the oil level inside the oil tank 106 due to the attitude of the aircraft. The oil level is generally measured using elongate probes or sensors located at discrete locations. The oil level may vary as the attitude, such as pitch, roll, and yaw, of the aircraft changes. Aircraft attitude and the shape of the oil tank 106 may affect the variation in the surface of the oil inside the oil tank 106, and hence the oil level measured at the discrete sensor locations. Such variations due to attitude of the aircraft may be accounted for by the processor 204 in the similar manner as that of oil gulp. For example, such variations may be filtered out by sampling at low frequencies or averaging over a suitably long period of time. In some examples, a characteristic between aircraft attitude and the oil level may be utilized. In some examples, the characteristic may be static and may be based on the shape of the oil tank 106 and mounting of the oil tank 106 on the aircraft. In other examples, the characteristic may be learned over a training period.

The oil level may be affected by the amount of oil inside the oil tank 106. This is due to dynamic behaviour of the surface of oil as the oil is not static with feed flows and return flows inside the oil tank 106. This variation may be accounted by using a suitable characteristic based on the oil level inside the oil tank 106. For example, the characteristic may be a static characteristic and may be based on dynamic behaviour of oil within the oil tank 106 at various levels. A learning-based approach may also be utilized for the oil level inside the oil tank 106 at various levels of oil.

In some embodiments, the processor 204 may consider engine deterioration as one of the dynamic events. In general, oil consumption rates tend to increase with deterioration of the engine 10. Such variations may be accounted by monitoring state of oil and/or consumption of oil with engine cycles. In some examples, such variations may be learned over a training period. Further, in some embodiments, the processor 204 may consider engine to engine variation as one of the dynamic events as oil consumption may vary with the engine type. Such variations may be accounted in a similar manner as described above.

The processor 204 may determine the trend in oil conditions after accounting for the variations described above. The trend may be determined through a number of methods. In some embodiments, the processor 204 may be configured to determine a time differential of an instantaneous oil level or an average oil level. The time differential may provide a rate of oil consumption of the engine 10. The rate of oil consumption may be used for further analysis as described later.

In some embodiments, the processor 204 is further configured to use the one or more engine and aircraft conditions in a trend model. In some embodiments, the trend model includes at least one of a linear regression, a non-linear regression model, a support vector machine-learning based model, a first principle model, a Hidden Markov model, and a Bayesian networks-based model.

In some embodiments, the processor 204 may determine the trend in oil conditions through the linear or non-linear regression model of the oil level inside the oil tank 106. For example, the oil level may be correlated with a remaining duration of time to empty. In some embodiments, the linear regression model may utilize the least squares method. It should be understood that any type of regression model may be utilized within the scope of the present disclosure. For example, a recursive least squares (RLS) approach may be utilized which conducts the linear regression of the oil level against time. In this approach, the instantaneous rate of change (or slope) of the oil level and offset of the linear regression may also be obtained. Further, a linear extrapolation of the oil level may be performed by using coefficients of the linear regression analysis.

The linear regression model may allow the oil level to be predicted over time without the need for large amount of data as compared to conventional linear regression analysis. This approach may be particularly helpful for online implementation of the regression analysis since it is more computationally efficient and requires less amount of data. Further, this approach may not be affected by variation in oil level caused due to engine maintenance activities, such as oil refilling. This approach may also improve accuracy of prediction of the oil level since the rate of change or slope may always lean towards the latest data points of the oil level. This may be due to incorporation of an error function to reflect the current rate of consumption of oil.

In some embodiments, the processor 204 may determine the trend in oil conditions using support vector machine-learning (SVM) based model. The SVM based model involves solving a quadratic programming (QP) problem (hereinafter, QP problem) with linear constraints when a set of training data with a label is provided. Alternatively, the processor 204 may determine the trend in oil conditions using a modified approach, i.e., Least-squares support vector machine-learning (LS-SVM) based model. LS-SVM based model is a less complex approach than SVM wherein a linear set of equations is obtained for optimization instead of a QP problem in a dual space. A size of matrix involved in the QP problem is directly proportional to the number of training points. Instead of solving a QP problem as in an SVM based model, LS-SVM based model may obtain the solutions of a set of linear equations that may be used for online prognosis purposes.

In some embodiments, the processor 204 may utilize a first principle model or a physical model to determine oil consumption behaviour. The first principle models are based on first principle physical laws, such as mass, energy, momentum conservation laws, etc. Such models may be utilized to predict oil consumption rate and associated remaining useful life of oil.

In some embodiments, the processor 204 may determine the trend in oil conditions using a Hidden Markov model (HMM). HMM may be utilized for analysis of a continuous process, such as oil consumption, since oil tank level is a time-series of observations that may have different characteristics during the operation of the engine 10. The HMM may be characterised by a series of states, each of which can capture the oil tank level at different times during the operation of the engine 10. HMM may be utilized to simulate the oil consumption from the beginning. The oil tank level may be seen as a set of states or nodes. HMM with its state machines may enable quantification of the state behaviour and the transition between different states probabilistically with a confidence measure.

In some embodiments, the processor 204 may determine the trend in oil conditions using a Bayesian networks-based model (BN). BN based models describes the relationships between causes and effects, and are made of random variables (network nodes) and relationships between the random variables (arcs). BN based models may allow functional events to be expressed as joint probabilities of various events that lead to the functional event. BN based models capture both conditionally dependent and conditionally independent relationships between random variables. Such models may be prepared or learned from data, and then may be used to estimate the probabilities for the functional events. In BN based models, both the probability distributions for the network nodes and the arcs are specified subjectively. Hence, BN based models may then capture a belief about a complex domain. To apply the BN based model for determining the trend in oil conditions, a distributional network (BN) may be developed that estimates expected time towards various oil levels in the oil tank 106. Once the BN is determined, network nodes, and thus a distributional belief may be updated as new data becomes available. This allows explicit quantification of remaining oil level inside the oil tank 106 with associated uncertainty.

The processor 204 then determines the high oil consumption by the engine 10 based on a comparison of the trend in oil conditions obtained as described above with the threshold or the comparison model. For example, the trend in oil conditions may provide at least one of the rate of consumption of oil or the time duration of remaining oil which may then be compared with the threshold or the comparison model.

In some embodiments, the processor 204 may compare the trend with a threshold including at least one of an oil consumption limit and a remaining time to a predetermined level of oil. For example, oil consumption limit may be used to trigger an alert to a flight crew or a ground support system. In some embodiments, the oil consumption limit may differ for the flight crew and the ground support system.

In some embodiments, the oil consumption limit may be a static limit for a given engine. In another embodiment, the oil consumption limit may vary depending upon the age of the engine 10. In other embodiments, the oil consumption limit may vary depending upon length of the flight. In some embodiments, the threshold oil consumption limit may be obtained remotely using learning from the behaviour of a fleet of engines.

In some embodiments, the time duration of remaining oil or remaining oil time may be compared with a planned flight time. The planned flight time may be acquired from a flight management system. If the remaining oil time crosses a predetermined threshold time margin within the planned flight time, an alert may be generated. In some embodiments, the alert may be generated for remaining oil time to a predetermined oil level inside the oil tank 106. In some embodiments, the predetermined oil level may be zero or absolute starvation of oil. In another embodiment, the predetermined oil level may be an oil level above zero with a margin to empty.

In some embodiments, both the oil consumption limit and the remaining time to a predetermined level of oil are utilized to generate the alert. For example, both these parameters may be utilized in a weighted scheme that determines if the alert needs to be triggered. Such a weighted scheme may improve the reliability of alerts and reduce false triggers. Some of the methods specified above, such as the recursive least squares (RLS) approach, that determine trend in oil conditions may also output an accuracy or error parameter. Such parameters may also be utilized to reduce false triggers. In some embodiments, such parameters may be permitted to trigger an alert only when they are below a predetermined threshold value.

In some embodiments, the processor 204 may utilize the comparison model of the oil system 100 to determine the high oil consumption. Such models may directly take into account the variation in the oil level due to one or more dynamic parameters. In some embodiments, the comparison model includes at least one of a real-time model of the oil level, an oil consumption behaviour model, an adaptive model based on Kalman filter, and a neural network.

In some embodiments, the comparison model may be a real time model of the oil level. In another embodiment, the comparison model may be the oil consumption behaviour model that is associated with variation in engine conditions described above and may be trained over an engine development programme. At any given point during the flight duration, the current oil level or the rate of consumption of oil may be compared to the comparison model and an alert may be triggered if the trend in oil level or conditions diverge over a certain limit towards oil starvation.

In some embodiments, the comparison model may be the adaptive model based on Kalman filter. The adaptive model may be similar to the real time model, as described above, with an adaptive element provided by the Kalman filter. The adaptive element may match the modeled oil level or rate of consumption of oil with that of the engine 10 on which it is installed. The effort that this adaptive element needs to put in order to match the oil level or rate of consumption of oil may be an indicator of the diversion of the engine 10 from a normal engine. When the effort reaches a predetermined level towards oil starvation, an alert may be triggered.

In some embodiments, the comparison model may include the neural network. The neural network may consider parameters such as oil level, oil temperature, engine shaft speed, etc. and may be trained during development of an engine to output a rate of consumption of oil. The neural network may then be adapted within certain limits during the training phase for a specific engine. At any point during a flight duration, the rate of consumption of oil at any given point may be compared with a prediction of the neural network. An alert may be triggered if the actual rate of consumption of oil diverge too far towards oil starvation.

The system 200 further includes one or more output devices 206 communicably coupled to the processor 204. The one or more output devices 206 is configured to generate the alert if high oil consumption is determined. For example, the processor 204 may output the alert to the flight crew or the ground support system.

In some embodiments, the system 200 may further include additional components (not shown), for example, a server, communication channels/links, input/output ports etc., operatively coupled to the one or more sensors 202, the processor 204 and the one or more output devices 206. The additional components may enable communication of data between the one or more sensors 202, the processor 204 and the one or more output devices 206.

Figure 6:
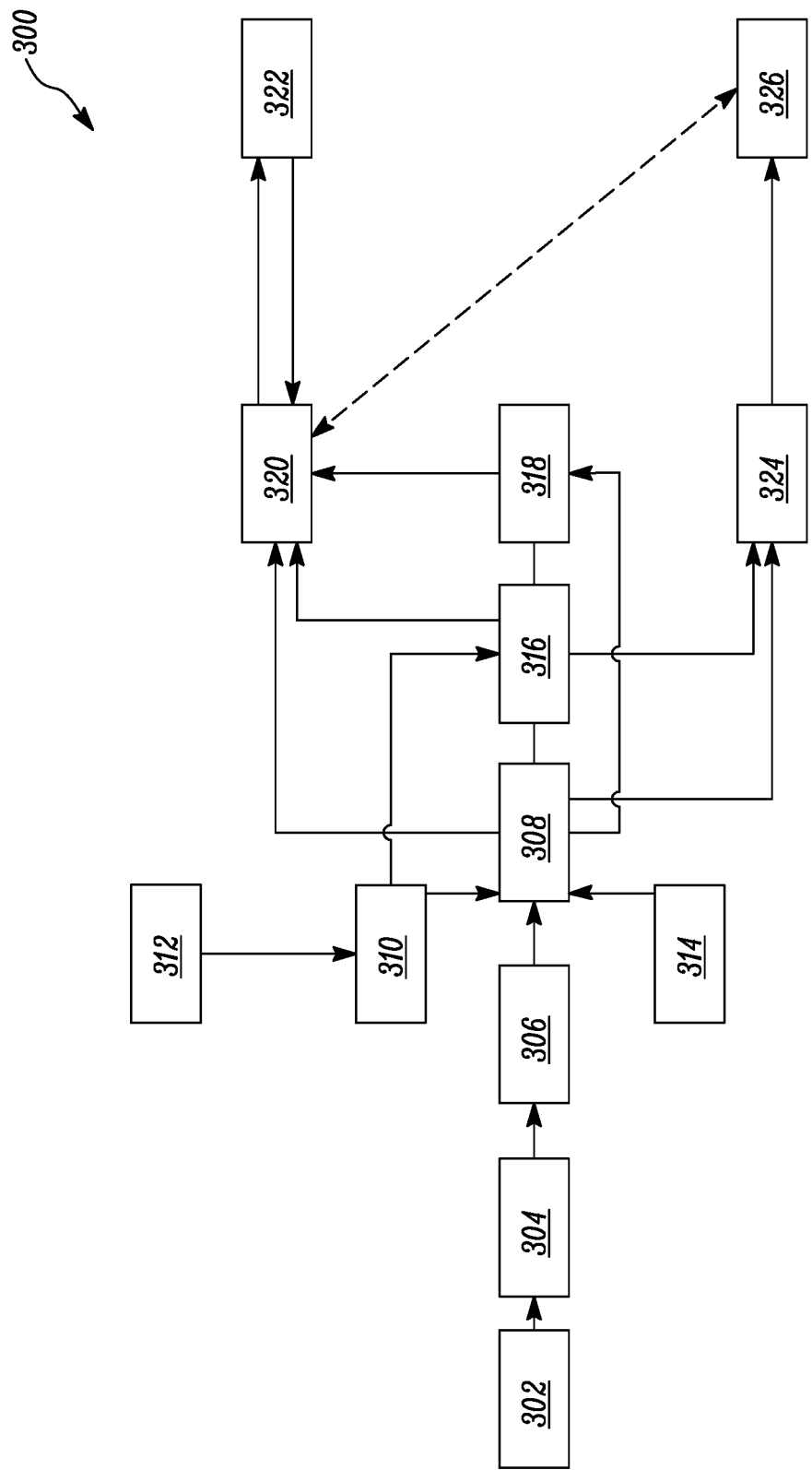
FIG. 6 is a schematic block diagram of a method for determining a high oil consumption in the gas turbine engine according to an embodiment of the present disclosure.

FIG. 6 illustrates a functional block diagram describing a method 300 for determining a high oil consumption in a gas turbine engine 10 of an aircraft. The method 300 is implemented using the system 200 of FIG. 5. Referring now to FIGS. 5 and 6, the method 300 includes using the one or more sensors 202 to detect the one or more engine and aircraft conditions and generate signals indicative of the one or more engine and aircraft conditions. The one or more sensors 202 may be a part of the oil system 100 as described in FIG. 4. The oil system 100 is schematically represented at block 302. The method 300 further utilizes the processor 204 to receive the signals from the one or more sensors 202. The processor 204 is configured to measure or determine the one or more engine and aircraft conditions at block 304 based at least on the signals received from the one or more sensors 202. The one or more engine and aircraft conditions include at least one of the oil quantity, the oil temperature, the oil pressure, the engine speed, the aircraft altitude, and the aircraft attitude.

The processor 204 is further configured to determine the trend in oil conditions at block 306 based on at least the one or more engine and aircraft conditions. The trend in oil conditions provides at least one of the rate of consumption of oil or the time duration of remaining oil. Next, the processor 204 is configured to determine the high oil consumption at block 308 based on the comparison of the trend in oil conditions with the threshold or the comparison model.

In some embodiments, the processor 204 is further configured to retrieve a flight information of the aircraft at block 310. The flight information may be acquired from the flight management system at block 312. The flight information may include aircraft information, such as a location of the aircraft, a current time zone, airport information, weather conditions, and a flight plan. Other fight information may include a forward speed and an altitude of the aircraft, a climb rate, and the like. Airport information associated with flight information may include an altitude, a runway topology, a runway length, a take-off airport, a landing airport, gate information, etc. Weather conditions may include ambient temperature, atmospheric pressure, wind speed, humidity, moisture, rainfall, icing conditions, etc. Additionally, weather conditions may be associated with a plurality of locations along various flight paths, or a portion of the atmosphere. Flight plan may include information regarding flight time, airways and waypoints, holding patterns, standard departure paths, arrival or departure times, etc. In an embodiment, the method 300 may include acquiring data from airport navigational assistance systems or on-board aircraft avionic systems. In yet another embodiment, the method 300 may include obtaining a historic flight information of the aircraft.

The processor 204 is further configured to retrieve an engine historic information at block 314. In some embodiments, the engine historic information may include engine servicing and maintenance history, engine speeds, component degradation rates, historical component failures, past performance data, fuel efficiency data, operating duration and conditions of the engine 10, historical sensor data associated with oil temperature, oil pressure, etc. In some embodiments, the engine historic information may be obtained from a storage device associated with the aircraft. In some embodiments, the storage device may also store past high oil consumption behaviour of the engine 10. The storage device may comprise any appropriate data storage device, including magnetic storage devices (e.g., a hard disk drive), optical storage devices, and/or semiconductor memory devices. The processor 204 is further configured to determine the high oil consumption further based on the flight information of the aircraft and/or the engine historic information.

In some embodiments, the processor 204 is further configured to determine an oil starvation condition of the engine 10 based on the high oil consumption at block 316. High oil consumption that may lead to oil starvation condition may be determined by considering all the above factors. Oil starvation condition may relate to a condition in which the engine oil may potentially become empty before the end of flight time.

In some embodiments, the processor 204 is further configured to determine an engine setting of the gas turbine engine 10 to mitigate the oil starvation condition at block 318. For example, the engine setting may include a power setting of the gas turbine engine 10. Power setting may prolong the time duration to reach oil starvation. This may provide the flight crew with more time to come up to a decision with greater flexibility. In some embodiments, the flight crew may choose to divert the flight over a different flight path. In other embodiments, the flight crew may choose another destination nearby in such situations. The alternative destinations may be selected based on availability of maintenance at such destinations.

In some embodiments, the processor 204 is configured to provide an oil starvation warning to the flight crew and/or the ground crew based on the high oil consumption. In other embodiments, the processor 204 is configured to provide the oil starvation warning to the flight crew and/or the ground crew based on the high oil consumption and oil starvation condition. The method 300 further includes informing the flight crew at block 320. In some embodiments, the alert may be provided to the flight crew through various available human machine interfaces (HMIs) at block 322 provided on the aircraft.

In some embodiments, the flight crew may be prompted to set the engine 10 to idle operating conditions to mitigate oil starvation condition. During the idle operating conditions, the engine 10 may continue to be monitored. For example, if no change is detected, the flight crew may be informed, and further course of action may be provided. Further course of action may include use of a full range of throttle movement for the engine 10 one or more times.

In some embodiments, the flight crew may be prompted to set the throttle of the engine 10 to various other power settings. In some embodiments, the power settings may be implemented for a predetermined period of time. During such time periods, the various engine parameters and the oil consumption rate may be detected. In some embodiments, the processor 204 may then recommend a power setting for the engine 10. Such a power setting may correspond to an engine setting that may provide the greatest run time for the engine 10 as well as the maximum thrust during the planned or amended course of the flight.

In some embodiments, the processor 204 may determine a relationship between engine power settings and oil consumption rate. For example, the processor 204 may utilize natural variation of engine power settings and oil consumption rate. In some embodiments, the processor 204 may output recommended engine settings that are most suitable for current flight plan. Such engine settings may then be communicated to the flight crew.

Similarly, the method 300 further includes alerting the ground crew at block 324. The ground crew may have access to the ground support system at block 326. This information may be helpful to the ground crew that may be monitoring engine health and other conditions of the engine 10. For example, the ground crew may be performing diagnostics on the engine 10. In another example, the ground crew may be using a fleet management system for fleet operations data of the engine 10. In some embodiments, the fleet management system may schedule engine maintenance based on the high oil consumption. The high oil consumption alert may allow engine health to be predicted with greater accuracy and improve scheduling of maintenance activities for the engine 10.

In some embodiments, the processor 204 may output the alert for high oil consumption or oil starvation warning through various available human machine interfaces (HMIs). In some embodiments, the alerts may be provided for each engine 10 of the aircraft separately. In some embodiments, the processor 204 may generate multiple alerts. In some embodiments, the processor 204 may determine the amount of data to be presented through the HMI and its timing. In some examples, the processor 204 may consider the operational conditions of the aircraft before outputting the alert through the HMIs. Operational conditions may include a take-off phase where any notification by the processor 204 may be suppressed. In other examples, the processor 204 may determine a fault status of other airframe systems to determine the relative priority of the alerts provided. In some embodiments, the alerts may be provided for each engine 10 of the aircraft separately. In some embodiments, the alert may be provided on a flight deck messaging system.

In some embodiments, the flight crew may be alerted about oil starvation for the first time through the available aircraft alerting mechanism, such as engine-indicating and crew-alerting system (EICAS) or Electronic centralised aircraft monitor (ECAM). Such an alert may be augmented by providing the flight crew with the engine oil quantity indicators and highlighting a problem with the engine 10.

In some embodiments, the processor 204 may output a visual alert to the flight crew or the ground crew. It is to be understood that any form of visual change may also be provided that seeks attention of the flight crew or the ground crew. In some embodiments, the processor 204 may output an audio alert to the flight crew or the ground crew. In some embodiments, the processor 204 may provide the audio alert with a constantly increasing level of sound. In another embodiment, the processor 204 may provide a first audio alert with a first sound output and a second audio alert later having a second sound output being greater in amplitude than the first sound output. As such, the second audio indication may be greater in sound output than the first audio indication. In some embodiments, the processor 204 may provide a haptic alert or any other form of physical indication. It is to be understood that the processor 204 may generate a combination of visual, audio and haptic alerts or any other form of alert based on application requirements.

In some embodiments, the processor 204 may lead the flight crew through a decision making process. For example, the HMI may be designed to allow the flight crew to undergo a series of connected steps to arrive at a decision when high oil consumption is determined by the processor 204.

Figure 7:
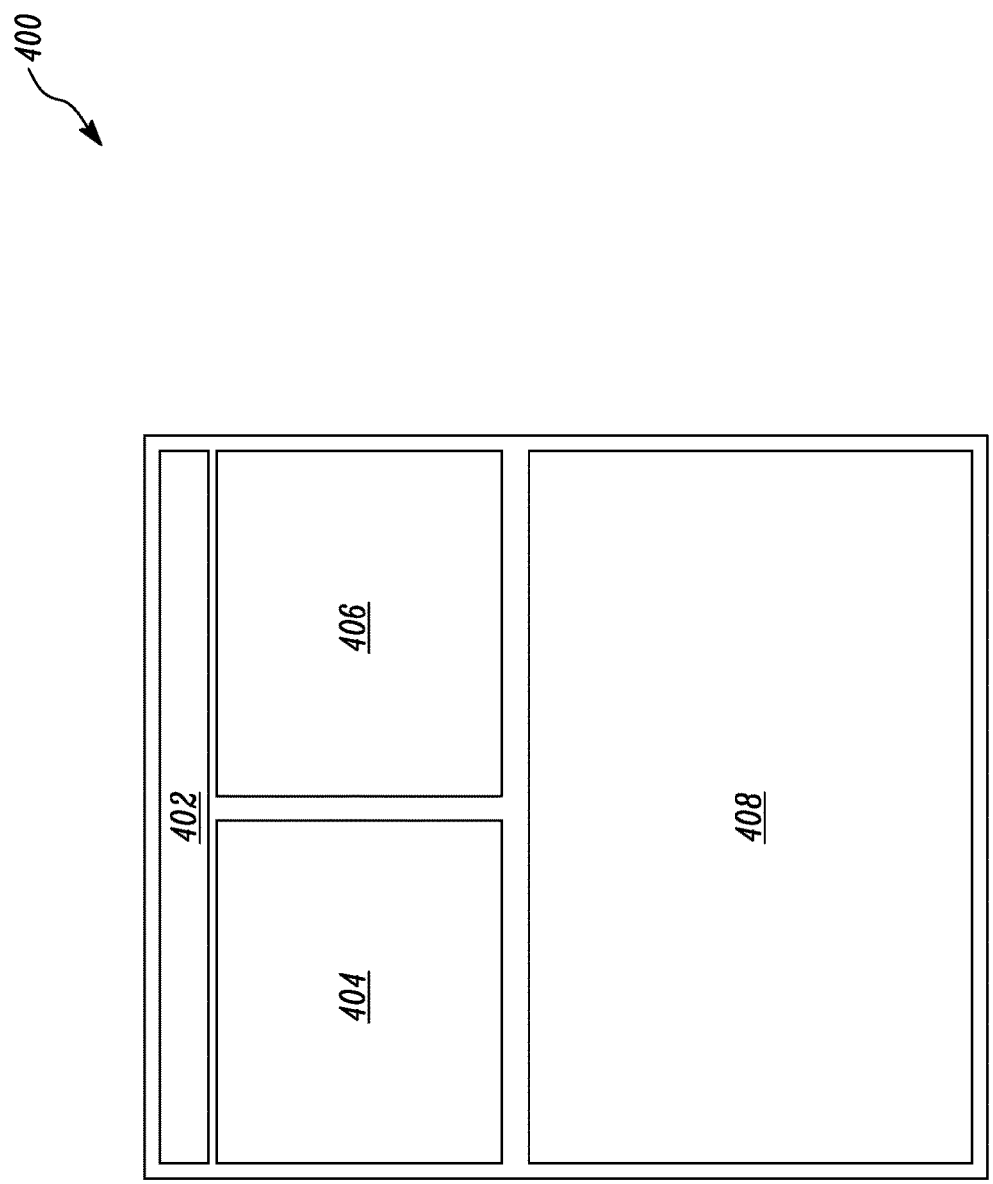
FIG. 7 illustrates a human machine interface (HMI) used with the system of FIG. 5 according to an embodiment of the present disclosure.

FIG. 7 illustrates a Human Machine Interface (HMI) 400 for a first step of the decision making process. Such HMIs may be available with the flight management system or the ground support system. In some embodiments, the HMI 400 may be a part of the one or more output devices 206. In another embodiment, the one or more output devices 206 may be a dedicated application window for high oil consumption. It should be understood that the amount of data may be adapted based on application requirements. The amount of data may also be dependent upon the amount of information available with the functions described above.

The HMI 400 for the first step of the decision making process may involve diagnosis of the engine 10 to determine a cause of the high oil consumption or oil starvation warning. In the illustrated example, the first step may include a first portion 402 for selecting the engine 10 of the aircraft. A second portion 404 may describe operational data of the engine 10 selected in the first portion 402. For example, engine operational data may include an engine oil quantity. A third portion 406 may describe the flight information of the aircraft. For example, the flight information may include a current and a planned flight time, an oil temperature, an oil pressure, a current oil quantity, a remaining oil time, etc. Flight time may be acquired from the flight management system. A fourth portion 408 may describe a trend in oil conditions. For example, the fourth portion 408 may show a graph or chart describing rate of change of oil quantity over time.

Figure 8:
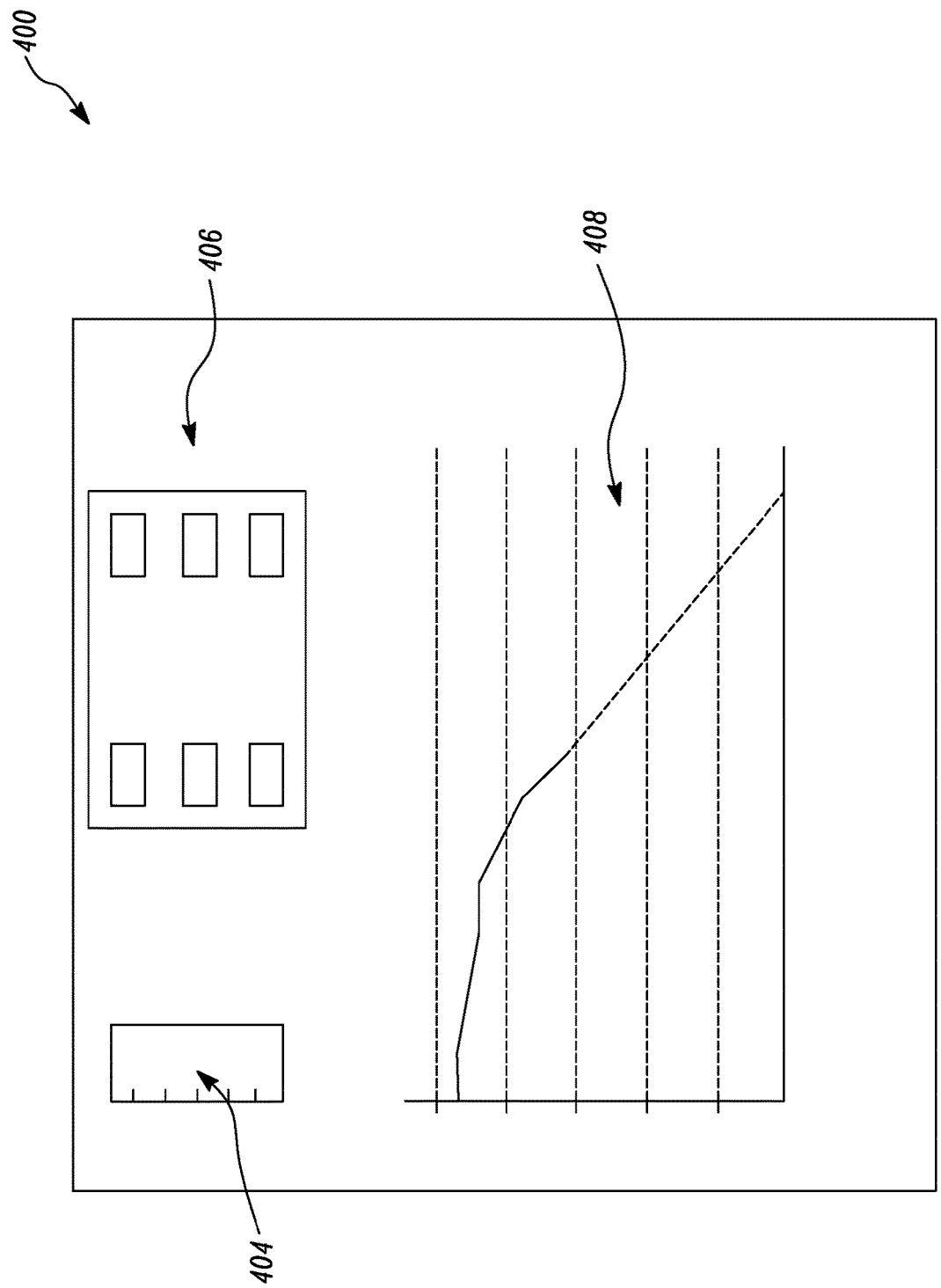
FIG. 8 is a schematic illustration of an exemplary output of the human machine interface (HMI) of FIG. 7.

FIG. 8 illustrates the HMI 400 showing an example of the first step of the decision making process. The HMI 400 includes the first portion 402 for selecting the engine 10 of the aircraft. The HMI 400 further includes the second portion 404 that indicates a quantity of oil available. The third portion 406 indicates flight information of the aircraft which includes the current and planned flight time, the oil temperature, the oil pressure, the current oil quantity, and the remaining oil time. The fourth portion 408 indicates the rate of change of oil over time.

Figure 9:
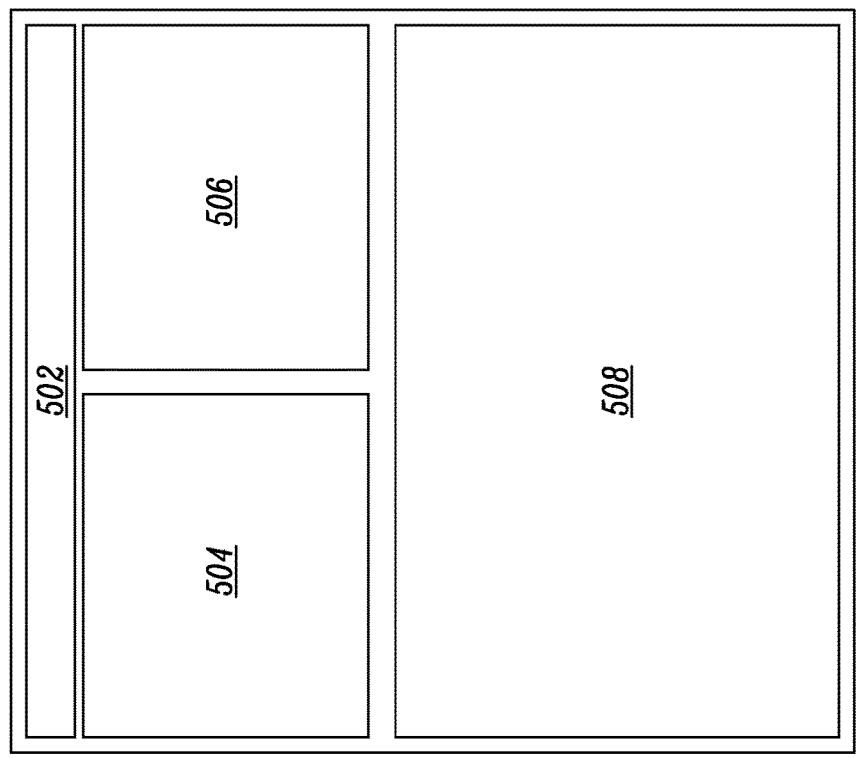
FIG. 9 illustrates an exemplary human machine interface (HMI) used with the system of FIG. 5 according to another embodiment of the present disclosure.

FIG. 9 illustrates an HMI 500 for a second step of the decision making process. The second step may allow the flight crew to assess options and decide a way forward. The HMI 500 may include a first portion 502 for selecting the engine 10 of the aircraft. A second portion 504 may describe information associated with airport available which may be derived from the flight management system data. For example, the information may include a departure airport, a selected diversion airport, a destination airport, etc.

Additional information, such as predicted time to reach such airports and maintenance support available at such airports for a given airline, may also be provided through the second portion 504. The second portion 504 may also include an option to select various engine settings, if the relationship between engine settings and oil consumption rate has been established as described above. For example, the engine settings may include a power setting of the engine 10. In some embodiments, the impact of engine settings on the flight time may also be displayed relative to the remaining oil time at that specific engine setting. A third portion 506 of the HMI 500 may describe the updated flight information of the aircraft based on options available with the second portion 504. A fourth portion 508 may describe a trend in oil conditions. In some embodiments, the predicted flight time may be superimposed on the trend in oil conditions. It should be understood that the HMI 500 is by way of example only and may be adapted based on application requirements. The amount of data may also be dependent upon the amount of information available with the functions described above.

In some embodiments, a third step of the decision making process may include a relevant operation checklist based on the option(s) chosen from the above steps. For example, the relevant operation checklist may display a set of relevant tasks to be performed by the flight crew in the form of a checklist. In some embodiments, the checklist may be displayed by the processor 204 though the one or more output devices 206. In another embodiment, the checklist may be displayed on a dedicated checklist application present on flight decks. In other embodiments, the checklist may be displayed on the dedicated application window for high oil consumption.

In some embodiments, the decision making process further includes a dedicated window for reviewing the output of the decision making process. For example, the window may show a new flight plan with latest predications for oil consumption and a trend in oil conditions. In some embodiments, the window may be a part of the dedicated application window for high oil consumption. Such a window may be dismissed and may be recalled by the flight crew to allow the flight crew to continue monitoring the oil consumption of the engine 10. In some embodiments, any further change in trend in oil conditions may be reported to the flight crew through subsequent alerts. The flight crew may then re-evaluate the output of the decision making process. In such cases, the decision making process may be repeated again to allow the flight crew to select other available options.

In some embodiments, the ground crew may only be notified in case the high oil consumption is detected but the rate of oil consumption is not high enough that may result in oil starvation warning being triggered. In such conditions, the ground crew may only be notified. For example, the ground crew may be notified by the ground support system.

In some embodiments, digital datalink systems such as Aircraft Communications Addressing and Reporting System (ACARS) or satellite communication may be utilized for communication with the ground crew or the ground support system.

In some embodiments, data associated with high oil consumption or oil starvation, such as the engine and aircraft conditions, the trend in oil conditions, etc. may be shared with the ground crew or the ground support system for diagnosis.

In some embodiments, the data may be processed to limit the amount of data that is required to be sent to the ground crew or the ground support system. For example, data may be pre-processed to select only specific window(s) of data. In some examples, the resolution or sample rate of values may be reduced. In other examples, the data may be compressed using data compression algorithms. Such a processing may be utilized to provide data that is sufficient to aid initial diagnosis of the engine 10 or the aircraft and any further information may be communicated though a higher bandwidth means, such as GateLink or WiFi once the aircraft has landed. Alternatively, a signal may be sent to the airframe to provide further data if the initial data indicate an issue with the engine 10 or the aircraft that needs urgent attention.

In some embodiments, the on board processor 204 may not be able to diagnose a potential oil starvation condition of the engine 10. In an example, this may occur when the engine or aircraft conditions lie on a boundary region of the threshold oil consumption. In such instances, the ground crew or the ground support system may be utilized to decide high oil consumption. The data associated with engine and aircraft conditions may be sent to the ground crew or the ground support system for analysis and review. If high oil consumption or oil starvation condition is determined by the ground crew or the ground support system, the flight crew may be alerted as required. In some embodiments, the flight crew may be alerted through existing airline maintenance operational groups, such as Maintrol. In other embodiments, the flight crew may be alerted directly through the dedicated application window for high oil consumption.

Figure 10:
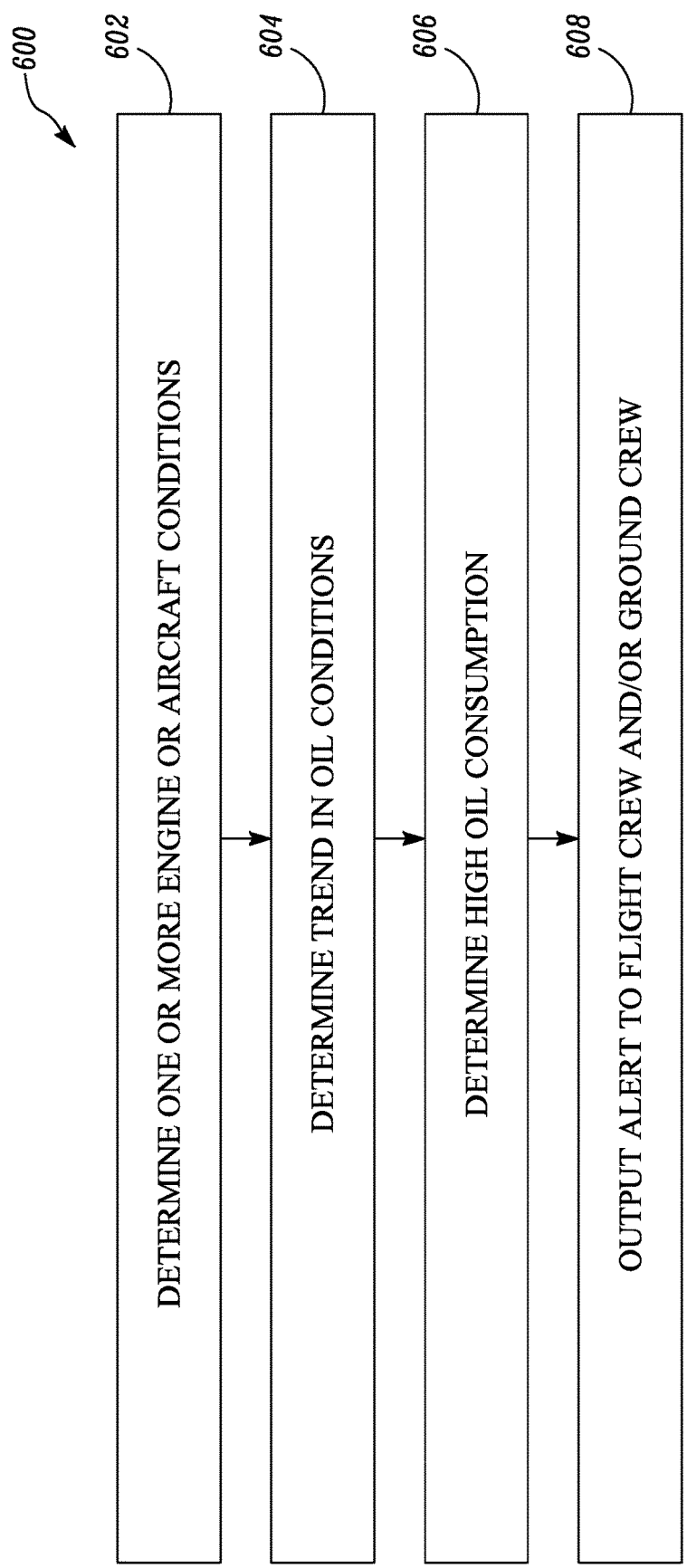
FIG. 10 is a flow chart illustrating a method for determining a high oil consumption in the gas turbine engine.

FIG. 10 illustrates a flow chart describing a method 600 for determining the high oil consumption in the gas turbine engine 10 of the aircraft. The method 600 may be implemented using the system 200 described above. Referring to FIGS. 1-10, at step 602, the method 600 includes determining one or more engine and aircraft conditions. In some embodiments, the one or more engine and aircraft conditions includes at least one of an oil quantity, an oil temperature, an oil pressure, an engine speed, an aircraft altitude, and an aircraft attitude.

At step 604, the method 600 further includes determining the trend in oil conditions based on at least the one or more engine and aircraft conditions. The trend in oil conditions provides at least one of the rate of consumption of oil or the time duration of remaining oil.

In some embodiments, determining the trend in oil conditions may further include determining the time differential of the instantaneous oil level or the average oil level. In some embodiments, determining the trend in oil conditions may further include using the one or more engine and aircraft conditions in the trend model. In some embodiments, the trend model includes at least one of the linear regression, the non-linear regression model, the support vector machine-learning based model, the first principle model, the Hidden Markov model, and the Bayesian networks-based model.

At step 606, the method 600 further includes determining the high oil consumption based on the comparison of the trend in oil conditions with the threshold or the comparison model. In some embodiments, the threshold includes at least one of the oil consumption limit and the remaining time to the predetermined level of oil. In some embodiments, the comparison model includes at least one of the real-time model of oil level, the oil consumption behaviour model, the adaptive model based on Kalman filter, and the neural network.

The method 600 may further include determining the variation in the oil level based on one or more dynamic parameters. The one or more dynamic parameters may include at least one of the oil gulp, the oil temperature variation, the aircraft attitude, the change in oil level inside the oil tank 106, engine deterioration, and the engine-to-engine variation.

The method 600 may further include retrieving the flight information of the aircraft. The flight information may include at least one of the flight plan, ambient conditions, the location of the aircraft, and airport information. The high oil consumption may be determined further based on the flight information of the aircraft. The method 600 may further include retrieving the engine historic information. The high oil consumption may be determined further based on the engine historic information.

At step 608, the method 600 further includes outputting the alert to the flight crew and/or the ground crew based on the high oil consumption.

The method 600 may include determining the oil starvation condition of the gas turbine engine 10 based on the high oil consumption. The method 600 may further include providing the oil starvation warning to the flight crew and/or the ground crew based on the oil starvation condition.

The method 600 may further include determining the engine setting of the gas turbine engine 10 to mitigate the oil starvation condition. The engine setting may include the power setting of the gas turbine engine 10.

Flight crew and/or the ground crew may be alerted using the method 600 if high oil consumption by the engine 10 is detected. Various transient or dynamic conditions, such as oil gulp, may be taken into account for determining the high oil consumption, thereby preventing false alarms. The flight crew and/or the ground crew may further be alerted if the high oil consumption may lead to the oil starvation condition. The trend in oil conditions may advantageously allow the flight crew to determine the oil starvation condition in a timely manner. This may allow the flight crew and/or the ground crew to take informed decision to reduce disruption in operations, and hence, the operational costs of the airlines.

The method 600 may allow the high oil consumption information to be presented in an informative manner so as to improve the situational awareness of the flight crew regarding the aircraft engines, and to guide the flight crew through a decision making process. Human factors may also be considered regarding the manner in which the information is presented to ensure appropriate flight crew response. This may allow improved and more consistent outcomes in various conditions of the engine 10. The flight crew may choose to divert the flight to a maintenance base as opposed to landing at a remote location away from any maintenance support.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method for determining a high oil consumption in a gas turbine engine of an aircraft, the method comprising:
   determining one or more engine and aircraft conditions, wherein the one or more engine and aircraft conditions comprises at least one of an oil quantity, an oil temperature, an oil pressure, an engine speed, an aircraft altitude, and an aircraft attitude;

determining a trend in oil conditions using the one or more engine and aircraft conditions in a regression model, wherein the trend in oil conditions provides at least one of a rate of consumption of oil or a time duration of remaining oil;

determining the high oil consumption based on a comparison of the trend in oil conditions with a threshold or a comparison model;

determining an oil starvation condition of the gas turbine engine based on the high oil consumption;

determining a power setting of the gas turbine engine to prolong a time to reach the oil starvation condition, wherein the power setting is determined at least by setting throttle to idle followed by a full range of throttle movement; and setting the gas turbine engine to the power setting.

2. The method of claim 1, wherein determining the trend in oil conditions further comprises determining a time differential of an instantaneous oil level or an average oil level.

3. The method of claim 1, further comprising determining a variation in an oil level based on one or more dynamic parameters.

4. The method of claim 3, wherein the one or more dynamic parameters comprise at least one of an oil gulp, an oil temperature variation, the aircraft attitude, a change in the oil level inside an oil tank, engine deterioration, and an engine-to-engine variation.

5. The method of claim 1, wherein the threshold comprises at least one of an oil consumption limit and a remaining time to a predetermined level of oil.

6. The method of claim 1, wherein the comparison model comprises at least one of a real-time model of oil level, an oil consumption behaviour model, an adaptive model based on Kalman filter, and a neural network.

7. The method of claim 1, further comprising retrieving a flight information of the aircraft, wherein the flight information comprises at least one of a flight plan, ambient conditions, a location of the aircraft, and airport information.

8. The method of claim 7, wherein the high oil consumption is determined further based on the flight information of the aircraft.

9. The method of claim 1, further comprising retrieving an engine historic information, wherein the high oil consumption is determined further based on the engine historic information.

10. The method of claim 1, further comprising providing an alert to a flight crew and/or a ground crew based on the high oil consumption.

11. The method of claim 1, further comprising providing an oil starvation warning to a flight crew and/or a ground crew based on the oil starvation condition.

12. The method of claim 1, wherein the regression model is a linear or non-linear regression model of the oil quantity, which is an oil level in an oil tank, the oil quantity being correlated with the time duration of remaining oil.

13. The method of claim 1, wherein the power setting is idle.

14. The method of claim 1, wherein the power setting of the gas turbine engine maximizes thrust during the time before reaching the oil starvation condition.

15. A system for determining a high oil consumption in a gas turbine engine of an aircraft, the system comprising:

one or more sensors configured to detect one or more engine and aircraft conditions and generate signals indicative of the one or more engine and aircraft conditions; and a processor configured to receive the signals from the one or more sensors, the processor configured to:

determine the one or more engine and aircraft conditions, wherein the one or more engine and aircraft conditions comprise at least one of an oil quantity, an oil temperature, an oil pressure, an engine speed, an aircraft altitude, and an aircraft attitude;

determine a trend in oil conditions using the one or more engine and aircraft conditions in a regression model, wherein the trend in oil conditions provides at least one of a rate of consumption of oil or a time duration of remaining oil;

determine the high oil consumption based on a comparison of the trend in oil conditions with a threshold or a comparison model;

determine an oil starvation condition of the gas turbine engine based on the high oil consumption;

determine a power setting of the gas turbine engine to prolong a time to reach the oil starvation condition, wherein the power setting is determined at least by setting throttle to idle followed by a full range of throttle movement; and set the gas turbine engine to the power setting.

16. The system of claim 15, wherein the processor is further configured to determine the high oil consumption further based on a flight information of the aircraft and an engine historic information.

17. The system of claim 15, wherein the processor is further configured to determine the oil starvation condition of the gas turbine engine based on the high oil consumption.

* * * * *